Oct. 6, 1959    A. J. Å. LAGERLING    2,907,602
PIVOTALLY MOUNTED SAFETY WINDSHIELD
Filed Nov. 13, 1956    6 Sheets-Sheet 1
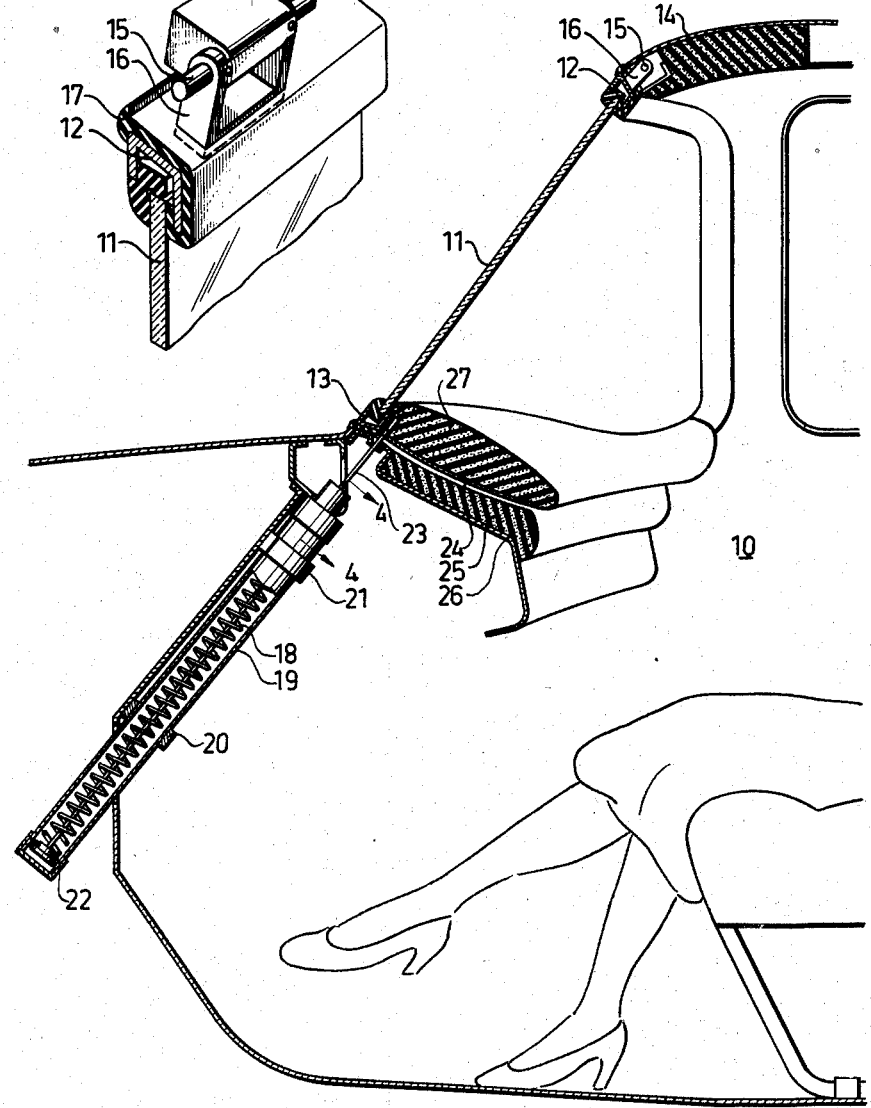
INVENTOR
Alf Johan Åke Lagerling
By
Pierce Scheffler & Parker
Attorneys

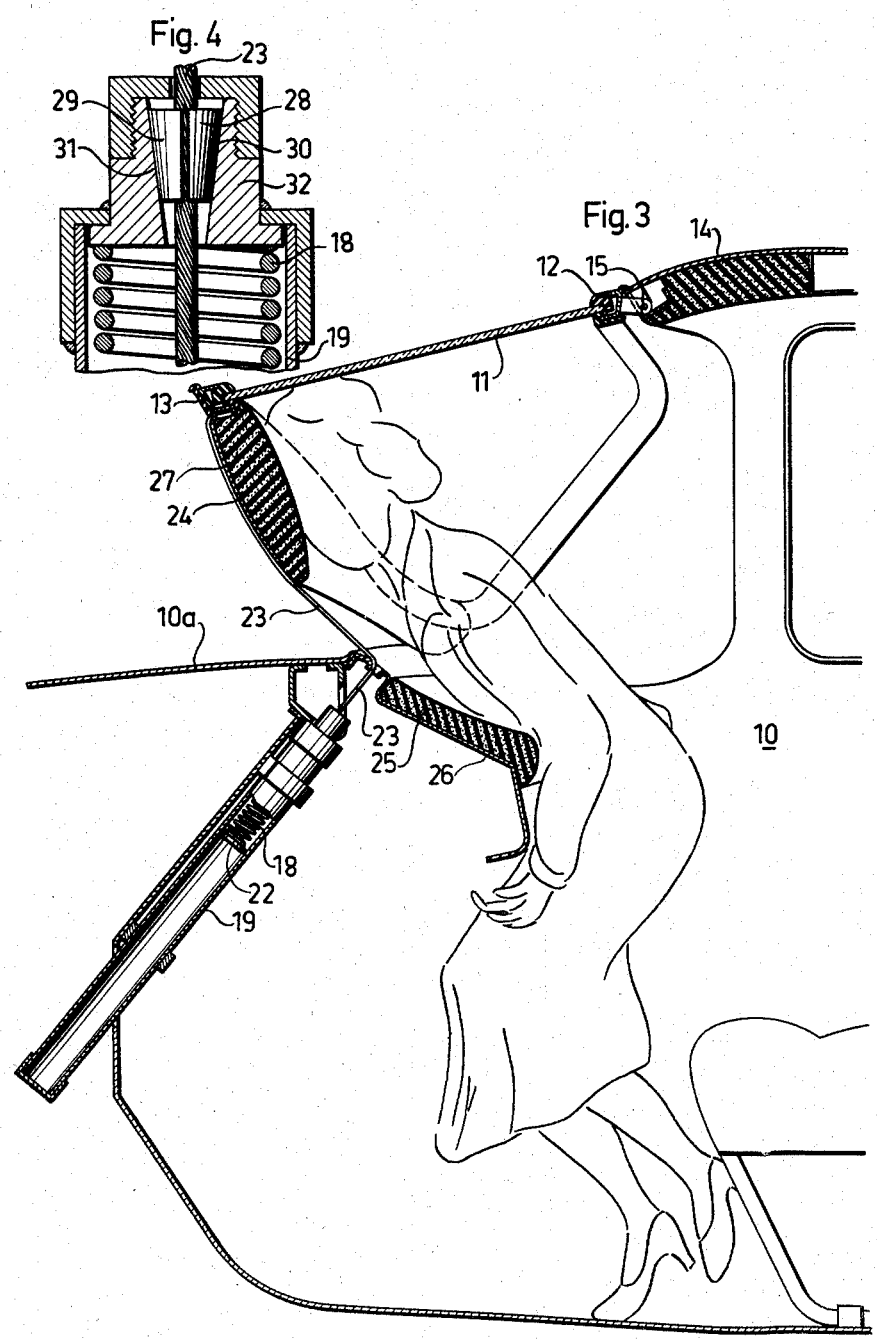

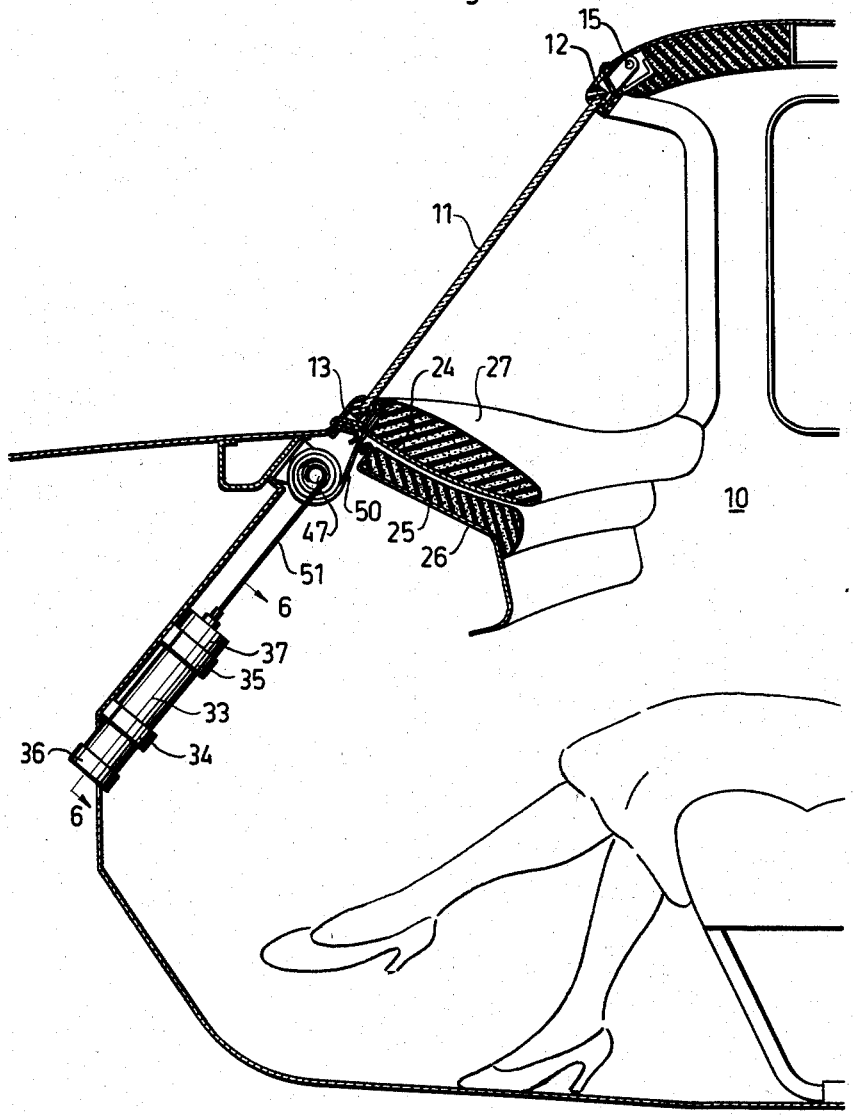

Oct. 6, 1959 A. J. A. LAGERLING 2,907,602
PIVOTALLY MOUNTED SAFETY WINDSHIELD
Filed Nov. 13, 1956 6 Sheets-Sheet 4

INVENTOR
Alf Johan Ake Lagerling

By Pierce, Scheffler & Parker
Attorneys

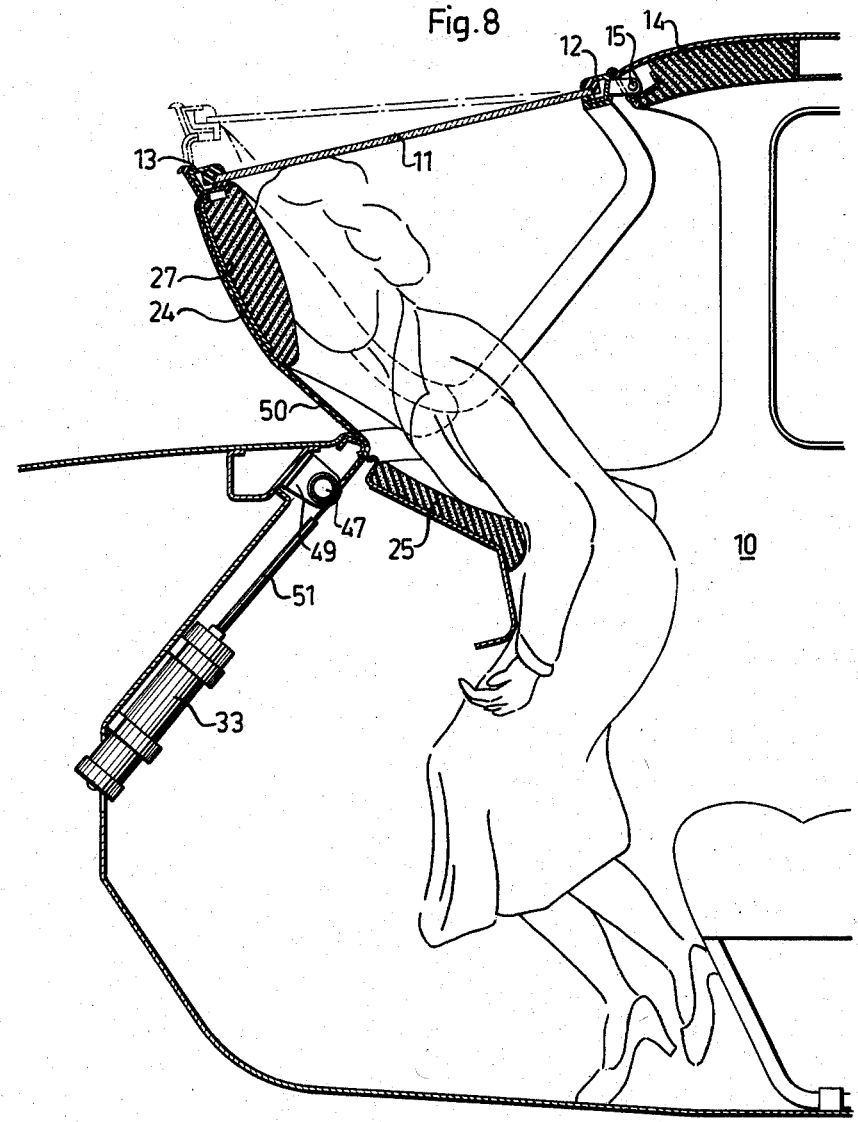

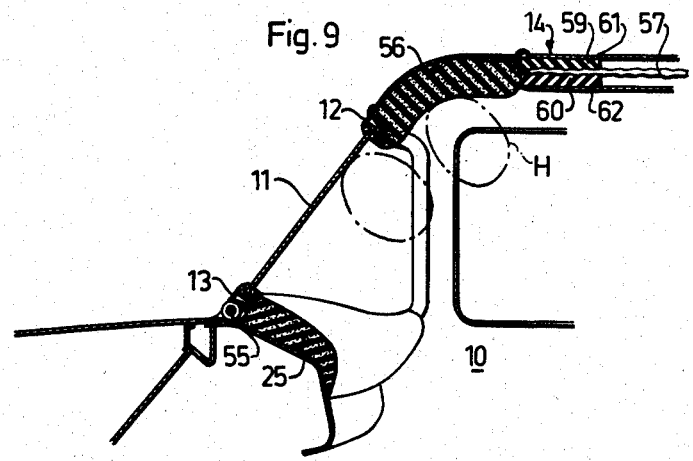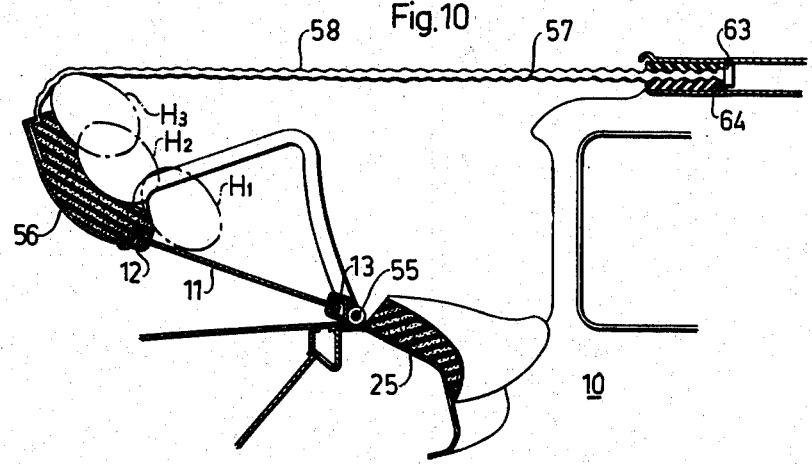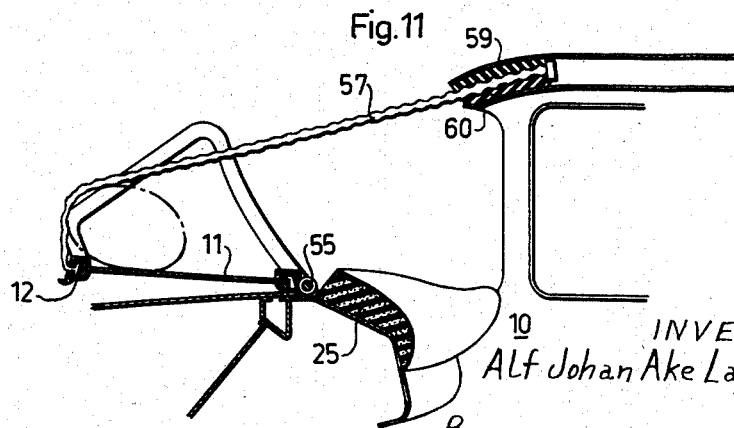

United States Patent Office 2,907,602
Patented Oct. 6, 1959

2,907,602
PIVOTALLY MOUNTED SAFETY WINDSHIELD

Alf Johan Åke Lagerling, Stockholm, Sweden

Application November 13, 1956, Serial No. 621,967

Claims priority, application Sweden November 10, 1955

10 Claims. (Cl. 296—84)

This invention relates to a safety windshield for motor vehicles, such as automobiles, and has for its primary object to provide a safety windshield which is simple in construction and highly reliable in its protective function and which normally maintains a position which in no way inconveniences the occupants of the vehicle, while assuming a protecting position to prevent injury to the occupants of the vehicle in case of collision or sudden stopping of the vehicle.

With these and other objects in view, the invention consists in certain novel features of construction, combination and arrangements of parts which will be described more fully below with reference to the accompanying drawings, in which—

Figure 6:
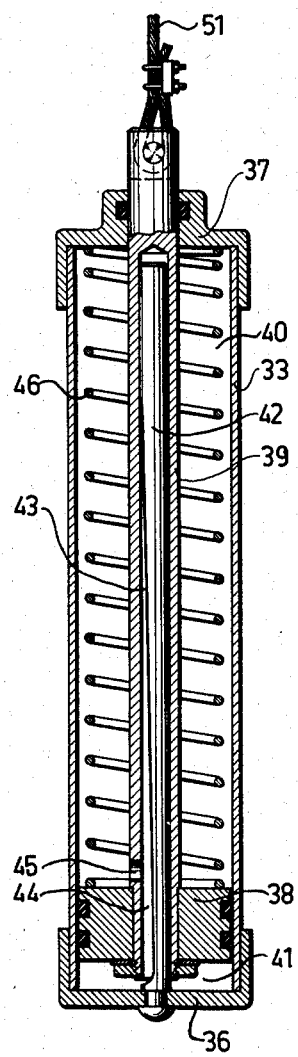
Figure 7:
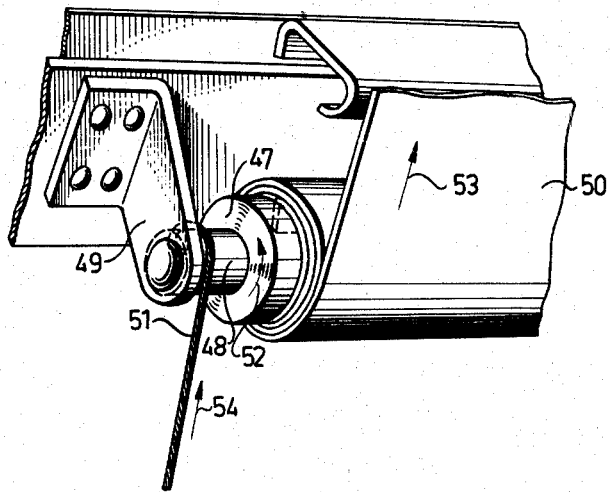

Fig. 1 is a fragmentary longitudinal sectional view showing a portion of an automobile having a safety windshield according to the invention, Fig. 2 a perspective view to an enlarged scale of a pivotal connection between the windshield frame and the roof of the vehicle, Fig. 3 a view similar to Fig. 1 with the windshield and associated parts in their positions which they will assume after a collision or sudden application of the brakes of the vehicle, Fig. 4 a detail sectional view taken on the line 4—4 of Fig. 1, Fig. 5 a view similar to Fig. 1 of a modified construction, Fig. 6 an enlarged detail sectional view taken on the line 6—6 of Fig. 5, Fig. 7 an enlarged perspective view of a detail of the construction shown in Fig. 5, Fig. 8 a view similar to Fig. 5 with the windshield and associated parts in protecting positions, Fig. 9 a view of another form of construction of the invention with the parts in normal positions, Fig. 10 a similar view showing the parts in protecting positions, and Fig. 11 a view similar to Fig. 10 of a simplified form of construction.

Referring to Fig. 1 of the drawing, reference numeral 10 denotes the body of a vehicle the windshield of which is indicated at 11. The windshield is mounted in a suitable, substantially rectangular frame which comprises an upper part 12 and a lower part 13, said parts being substantially horizontal. At or near each of its ends, the upper frame part 12 is pivotally connected to the roof 14 of the vehicle by means of hinge pins 15, see also Fig. 2, said hinge pins being provided on lugs 16 projecting from the frame part 12. A suitable weather-tight seal 17 is provided between the frame part 12 and the roof 14. The lower frame part 13 is normally maintained in position by means of helical springs 18, one spring only being shown in the drawing and described in the following. The spring is housed in a cylindrical case 19 which by means of brackets 20, 21 or similar suitable members is secured to the body 10. The upper end of the spring rests on the top end of the case 19 and the lower end of the spring rests against a seat 22 which is slidable within the case 19 longitudinally thereof and by means of a wire 23 is connected with the lower frame part 13. This frame part is further connected with a plate 24 which may be slightly arcuate and extends approximately at right angles to the plane of the windshield glass pane 11. In the normal position shown in Fig. 1, the plate 24 extends towards the interior of the vehicle above a cushion 25 on the dash-board 26. The plate 24 is fastened to a cushion 27 which consists of any suitable material, such as foam rubber, and which covers the upper face of the plate and projects somewhat beyond the inner edge of the cushion 25 or dash-board 26.

It is a well known fact that when a vehicle is brought to a sudden stop in case of collision or when the brakes are suddenly applied the occupant or occupants of the vehicle will be thrown against the windshield and may suffer serious injuries as a result of the force of the impact. It is also known that many attempts have been made to prevent such injuries by constructions which permit forward movement of the entire windshield when the windshield is subjected to a substantial impact from within the vehicle. Although with such constructions part of the impact is absorbed by the limited forward movement of the windshield, the remaining force of impact at the end of the forward movement has proved to be still great enough to cause fatal injuries. As will be apparent from the following description, the construction according to this invention constitutes a considerable improvement in this respect and reduces the final force of impact to a value which is not likely to cause serious injuries.

The spring 18 is comparatively strong. In the position shown in Fig. 1, the spring is slightly compressed to an extent such as to maintain the windshield in normal position and to prevent rattling of the windshield even under rough travel. If in case of collision or sudden braking of the vehicle an occupant is thrown forward, the head of the occupant will be thrown against the windshield at a place somewhat below the upper frame part 12. As a result of the impact to the vehicle, the windshield will be turned outward about the hinge pins 15 against the yielding force of the spring 18 which will be compressed due to its connection with the lower frame part 13 which will describe an arcuate path around the axis of the pivotal connection between the upper frame part 12 and the roof 14. During the turning movement of the windshield, the head of the occupant will hit and slide along the windshield pane in a direction towards the lower frame part 13 and will finally come into contact with the cushion 27 which then assumes the position shown in Fig. 3. There are two important circumstances which contribute toward the fact that the final impact with the cushion 27 will be considerably moderated. Firstly, it will be apparent from the drawing that the direction of the forward movement of the head of the occupant is not perpendicular to the plane of the windshield pane. In fact, the angle between said direction of movement and the plane of the windshield pane will successively become smaller as the windshield performs its turning movement. Secondly, the progressively increasing force of the spring during the compression thereof exerts a progressively increasing resistance to the outward movement of the windshield with the result that the impact will be absorbed during an extended period of time and the final impact with the cushion 27 will be a rather moderate one. The cushion 25 on the dash-board 26 moderates the force of the impact with the body of the occupant.

In order to prevent the spring 18 from rebounding from the position shown in Fig. 3, the wire 23 passes between two conical or wedge-shaped members 28 and 29 which abut against conical or otherwise inclined faces 30 and 31, respectively, of an end member 32 of the spring case 19 and permit free movement of the wire out of the case 19 but prevent movement of the wire in the opposite direction.

It will be apparent from Fig. 3 that the plate 24 also affords protection against upwardly projecting parts or edges of the front part or hood 10a in case said front part or hood be heavily deformed as a result of a collision.

In the form of construction illustrated in Figs. 5 to 8, a progressively increasing resistance to the outward movement of the windshield is obtained by means of a hydraulic device comprising a cylinder 33 which by suitable means, such as brackets 34 and 35, is held in fixed position. The cylinder is closed by a bottom member 36 and a top member 37. Within the cylinder there is slidably arranged a piston 38 which is rigidly secured to a tube 39 which is closed at its upper end and extends upwards through the cylinder top 37. The piston 38 divides the cylinder 33 into two chambers 40 and 41. Secured to the bottom 36 is a rod 42 which extends upward through a central opening in the piston 38 and into the tube 39. Beginning at some distance from its upper end, the rod 42 is grooved or bevelled to form a face 43 which is inclined downwards toward the axis of the rod to provide a passage 44 which communicates with the lower chamber 41 and the cross-sectional area of which is progressively increasing toward the lower end of the rod. An aperture 45 is provided in the tube 39 at a place slightly above the piston 38. A helical spring 46 which surrounds the tube 39 is inserted between the top member 37 and the piston 38. The cylinder 33 is filled with a suitable liquid, such as oil. A roller 47 is by means of journals 48 mounted in brackets 49, Fig. 7. On the roller 47 there is wound a sheet 50 of cloth, such as canvas, or rubber, the upper end of which is secured to the lower part 13 of the windshield frame. The top end of the tube 39 is connected to a wire 51 the upper end of which is fastened to the journal 48 in a manner such that the wire will be wound onto the journal when the roller and journal are rotating in the direction of the arrow 52, Fig. 7.

The spring 46 serves to maintain the parts described in the positions shown in Figs. 5 to 7 in which the windshield assumes its normal position. When the windshield is subjected to a substantial impact from within the vehicle, it will be turned outwards in the manner described with reference to the previously described form of construction. When the lower frame part 13 is moving forward, the flexible sheet 50 will be unwound from the roller 47 in the direction of the arrow 53 and the wire 51 will be moved upwards in the direction of the arrow 54, thereby moving the tube 39 upwards together with the piston 38 not only against the comparatively slight resistance of the weak spring 46, but also against the far more greater resistance to the flow of the liquid from the chamber 40 through the aperture 45 and the passage 44 into the lower chamber 41. As the piston 38 and tube 39 move upward, the cross-sectional area of that part of the passage 44 which faces the aperture 45 will gradually decrease, and as a consequence thereof the resistance to the flow of the liquid from chamber 40 to chamber 41 will increase, resulting in a progressively increasing resistance to the outward movement of the windshield. As soon as the aperture 45 arrives at the upper end of the face 43, liquid can no longer flow out of the upper chamber 40. The windshield and associated parts will then be arrested in the positions shown in Fig. 8 in which the flexible sheet 50 series as an additional protector or cushion member below the cushion 27.

With suitable dimensions of the aperture 45 and the passage 44, air may be used in the cylinder 33 instead of a liquid.

The small diameter of the journal 48 as compared with the diameter of the roller 47 results in that the height of the cylinder 33 can be correspondingly smaller as compared with the distance between the normal position of the frame part 13 shown in Fig. 5 and its end position according to Fig. 8.

In the embodiment illustrated in Figs. 9 and 10, the windshield 11 is pivotally mounted near its lower frame part 13 as indicated at 55, whereas the upper frame part 12 is connected to a cushion 56 which in the normal position of the windshield constitutes a protecting member between the windshield and the front end of the roof 14 to cushion an impact at this place as diagrammatically indicated by the head H of an occupant of the vehicle. At the end remote from the windshield, the cushion is connected with a flexible sheet 57 of a suitable material, such as rubber. This sheet has a great number of projections or transverse ridges 58 which normally engage corresponding grooves in linings 59 and 60 on the roof plates 61 and 62, respectively.

The mode of operation is similar to that described above with the difference that the windshield will be turned around its lower side and that the resistance to the outward movement of the windshield is exerted by frictional contact between the projections 58 of the sheet 57 and the projections of the linings 59 and 60. The magnitude and variation of this resistance depends upon the shape and arrangement of the frictionally cooperating projections as well as of the material of the flexible sheet and linings. Fig. 10 shows the outer end position of the various parts and the relative movement of the head H from the initial place of impact $H_1$ via the place of contact $H_2$ with the cushion 56 to the final position $H_3$ in which the impact is finally absorbed by the cushion 56 as well as the flexible sheet 57. The end position of the sheet 57 is defined by an abutment 63 adapted to engage a fixed stop 64.

Fig. 11 illustrates a simplified modification of the construction illustrated in Figs. 9 and 10 and differs therefrom merely by the fact that the cushion 56 is omitted and the flexible sheet 57 is directly connected to the upper frame part 12 of the windshield. The positions of the various parts correspond to those shown in Fig. 10.

While I have described and illustrated several specific embodiments of my invention, it should be understood that changes in the construction and arrangement of parts may be resorted to within the scope of the appended claims.

What I claim is:

1. In combination with a vehicle body having a dashboard and a normally substantially vertical windshield frame containing a windshield, means pivotally connecting the upper horizontal portion of the frame to the vehicle body to permit outward pivotal movement of the windshield about a substantially horizontal axis, a rigid plate secured to the lower portion of said frame and extending inwardly into the vehicle body above the dashboard, a cushion member secured to the upper portion of said plate, and yieldable means normally maintaining the windshield frame in its normal position and continuously resisting outward pivotal movement of said frame whereby upon the impartation of substantial impact to the vehicle body the windshield frame will pivot outwardly in opposition to said yieldable means to position said cushion to receive the head of a vehicle occupant thrown forwardly by the impact and to position said plate in the opening between the lower free portion of the frame and the vehicle body.

2. In combination with a vehicle body having a normally substantially vertical windshield frame containing a windshield, means pivotally connecting a horizontal edge portion of said windshield frame to the vehicle body to permit outward pivotal movement of the windshield with respect to the interior of the vehicle body about a substantially horizontal pivot axis, yieldable means normally maintaining the windshield frame in its normal vertical position and continuously resisting outward pivotal movement of said frame, a rigid plate secured to said windshield frame on the side thereof opposite that portion which is pivotally connected to the vehicle body, said plate being arranged on said frame to permit unobstructed vision in the normal vertical position of the windshield, and a cushion member on said plate, said cushion member being arranged to moderate impact with said plate by the head of an occupant of the vehicle when said windshield frame is in its outwardly pivoted position.

3. In combination with a vehicle body, a normally substantially vertical windshield frame containing a windshield, means pivotally connecting a horizontal edge portion of said windshield frame to the vehicle body to permit outward pivotal movement of the windshield with respect to the interior of the vehicle body about a substantially horizontal pivot axis, yieldable means connected to said vehicle body for normally maintaining the windshield frame in its vertical position and continuously resisting outward pivotal movement of said frame, and a cushion member secured to said windshield frame on the side thereof opposite that portion which is pivotally connected to the vehicle body, said cushion being arranged on said frame to permit unobstructed vision through the windshield in the normal position of the windshield frame and to be contacted upon outwardly pivotal movement of said frame by the head of an occupant of the vehicle thrown forwardly upon the impartation of impact to the vehicle.

4. Apparatus as defined in claim 3 wherein said windshield frame is pivotally connected at its lower horizontal edge portion to the vehicle body and said cushion member is connected to the top part of the windshield frame to constitute a protecting cushion between the windshield and the front end of the roof of the vehicle when the windshield frame is in its normal position and to assume upon outward pivotal movement of the windshield frame a position to be contacted by the head of a vehicle occupant thrown forwardly upon the impartation of impact to the vehicle body.

5. Apparatus as defined in claim 3 wherein said yieldable means comprises a spring member.

6. Apparatus as defined in claim 3 wherein said yieldable means comprises a cylindrical casing secured to the vehicle body, a helical spring within said casing and connected at one end thereto, and a flexible member connected at one end to the other end of said spring and at the other end to the windshield frame to normally maintain said frame in its vertical position and to permit pivotal movement thereof against the progressively increasing force of the spring upon a substantial impact from within the vehicle.

7. Apparatus as defined in claim 6 wherein said casing includes one-way stop means cooperating with said flexible member to permit movement of the flexible member for compressing said spring upon outward pivotal movement of the windshield frame and for preventing movement of the flexible member in the opposite direction.

8. Apparatus as defined in claim 3 wherein said yieldable means comprises a fluid cylinder, a piston dividing said cylinder into two compartments, said piston having a passage providing communication between the two compartments, means transmitting the pivotal movement of the windshield frame to the piston to move the piston within the cylinder, resilient means acting upon the piston to maintain the windshield frame in normal position, and a member arranged to restrict the flow area of said passage progressively in response to outward pivotal movement of the windshield, whereby to exert a progressively increasing resistance to said pivotal movement.

9. Apparatus as defined in claim 3 wherein said yieldable means normally maintaining the windshield frame in its vertical position comprises a flexible sheet connected at one end to the horizontal edge of the windshield frame other than the horizontal edge which is pivotally connected to the vehicle body, the other end of said flexible sheet being connected to the vehicle body to form a protecting sheet covering the opening formed upon outward pivotal movement of the windshield.

10. The structure as defined in claim 3 wherein said windshield frame is pivotally connected adjacent its lower horizontal edge to said vehicle body and said cushion is secured to said windshield frame adjacent its upper horizontal edge, and further wherein said yieldable means comprises a flexible protecting sheet normally located in the roof of the vehicle and having one of its ends connected to the upper part of said frame, and a member secured to said roof in engagement with part of the face of said sheet, said member and said sheet having interengaging projections to exert frictional resistance against outward pivotal movement of the windshield, said sheet covering the opening formed upon outward movement of the windshield.

References Cited in the file of this patent

UNITED STATES PATENTS

| 1,798,087 | Hyland | Mar. 24, 1931 |
| 2,032,630 | Northup | Mar. 3, 1936 |
| 2,091,057 | Straith | Aug. 24, 1937 |
| 2,200,936 | Ruesch | May 14, 1940 |
| 2,220,787 | Hooppaw | Nov. 5, 1940 |
| 2,770,003 | Comey et al. | Nov. 13, 1956 |

FOREIGN PATENTS

| 1,031,160 | France | Mar. 18, 1953 |